March 6, 1934.  C. CONTAL  1,950,047
PROJECTION APPARATUS FOR PUBLICITY OR OTHER USES
Filed Feb. 25, 1932  8 Sheets-Sheet 3

March 6, 1934.  C. CONTAL  1,950,047

PROJECTION APPARATUS FOR PUBLICITY OR OTHER USES

Filed Feb. 25, 1932    8 Sheets-Sheet 5

Inventor:
Camille Contal
per Fred F. Wadon
Attorney

March 6, 1934.  C. CONTAL  1,950,047
PROJECTION APPARATUS FOR PUBLICITY OR OTHER USES
Filed Feb. 25, 1932  8 Sheets-Sheet 8

Inventor
Camille Contal
Attorney.

Patented Mar. 6, 1934

1,950,047

UNITED STATES PATENT OFFICE 1,950,047

PROJECTION APPARATUS FOR PUBLICITY OR OTHER USES

Camille Contal, St. Cloud, France

Application February 25, 1932, Serial No. 595,067
In France March 4, 1931

12 Claims. (Cl. 88—27)

The present invention has as its object improvements in projection apparatus employed for publicity or any other use, in which a series of plates appear successively and automatically in front of the objective lens of a projection lantern.

The principal object of these improvements is to render the operation of this apparatus entirely automatic and to simplify the assembling and taking apart of their various members, so that any replacement of the latter that may be required, as well as their adjustment, may be easily and rapidly effected even by a person with little experience.

The apparatus according to the invention is carried by a light and solid frame which takes up little space and upon which all the members are fixed—namely, the optical system, support of the plates, a device for displacing the latter so that they will be projected successively etc.

As has already been said, the manner of assembling these members is such that they can be easily taken apart, put back in place and adjusted.

The principal feature of the invention is that the motor is mounted on the frame with the interposition of shock-absorbing devices arranged in such a manner that its vibrations and tremors will be incapable of being transmitted to the remainder of the apparatus, notably to the projected plate and to the objective lens, which vibrations and tremors would injure the pictorial effect of the projection.

There is also provided a device which, in conjunction with suitably arranged slide devices, guides the movement of the plates and prevents them from vibrating whilst they are being led into the field of the objective lens or replaced into their support and which fixes them in the desired position during the period of the projection.

According to the invention, the shutter, which serves to guide the plates and to keep them motionless in front of the objective lens during the projection, is itself guided by a device comprising rollers which hold its edges without allowing them any play, owing to suitably arranged restoring springs.

This device suppresses the vibrations of the shutter and the noise which results from them, in a more efficient manner than the device in which the edges of the shutter slide in grooves where they necessarily have a small amount of play.

The invention also provides a modification of this device, according to which the shutter is omitted and the plate is held simply by a suitably arranged spring.

This apparatus comprises other improvements the object of which is notably a particular manner of mounting the motor on the frame as well as a device which enables the apparatus to be stopped at will, for example in order to prevent its untimely operation during the mounting or the dismounting of a member.

Other features of the invention, notably relating to the methods of mounting and of adjusting the source of light and to a lubricating device, will be hereinafter described.

The accompanying drawings represent, by way of example, several methods of carrying out the invention.

Figs. 1 to 4 represent the frame of the apparatus; in these figures, the members that it supports are represented diagrammatically in dot-dash lines.

The frame of this apparatus, preferably formed from cast aluminium, may be mounted on any support upon which it rests with a foot 1 comprising holes 2 for screws or fixing bolts.

The foot 1 supports a table 3 adapted to receive a magazine drum 4 in which the plates (not shown) are arranged radially and can slide vertically.

Figures 5, 16:
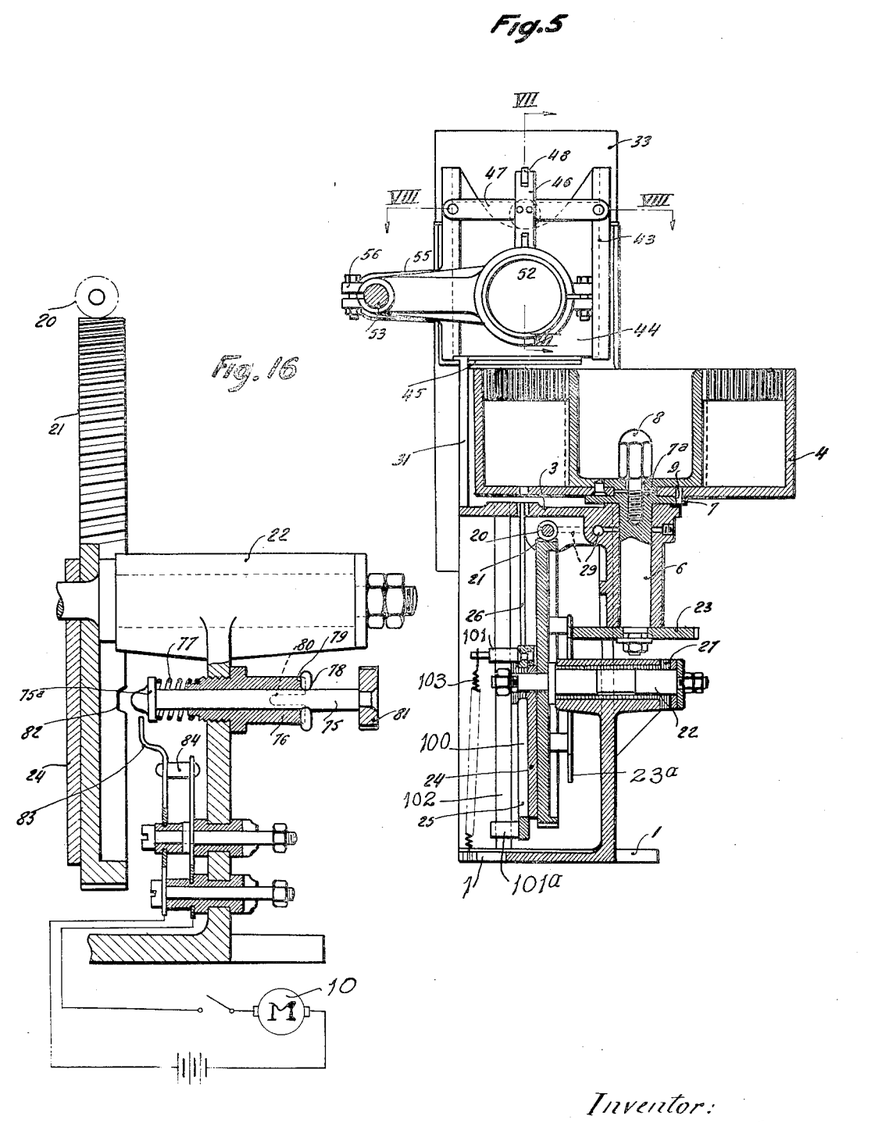
Figs. 5 and 6 represent the assembled apparatus, Fig. 5 being a section on the broken line V—V of Fig. 6 and Fig. 6 being a side elevation with parts in section.
Fig. 16 represents in vertical section a device for stopping the apparatus.

To this end, a vertical bore 5 is cut in the table 3 to receive an axle 6 terminated at its upper part by a plate 7 (Fig. 5).

The drum 4 rests on this plate on which it is centred by a shoulder 7a and fixed by a screw 8. An eccentric finger 9, integral with the plate, engages in a hole made in the bottom of the drum 4; it ensures the driving of the latter and fixes it in a predetermined position in relation to the axle 6.

A restoring device (not shown) constantly urges the finger 9 upwards and normally keeps it in the position shown; it enables it to be lowered when the drum is being put into position.

The head of the screw 8 is easily accessible so that the drum 4 can be rapidly put into position and dismounted.

The axle 6 is adapted to rotate in steps and imparts to the drum 4 a movement of intermittent rotation, the amplitude of which is equal to the angular distance separating two consecutive plates, so as to bring these plates successively to the right position relatively to the objective lens which will be hereinafter described.

Figure 6:
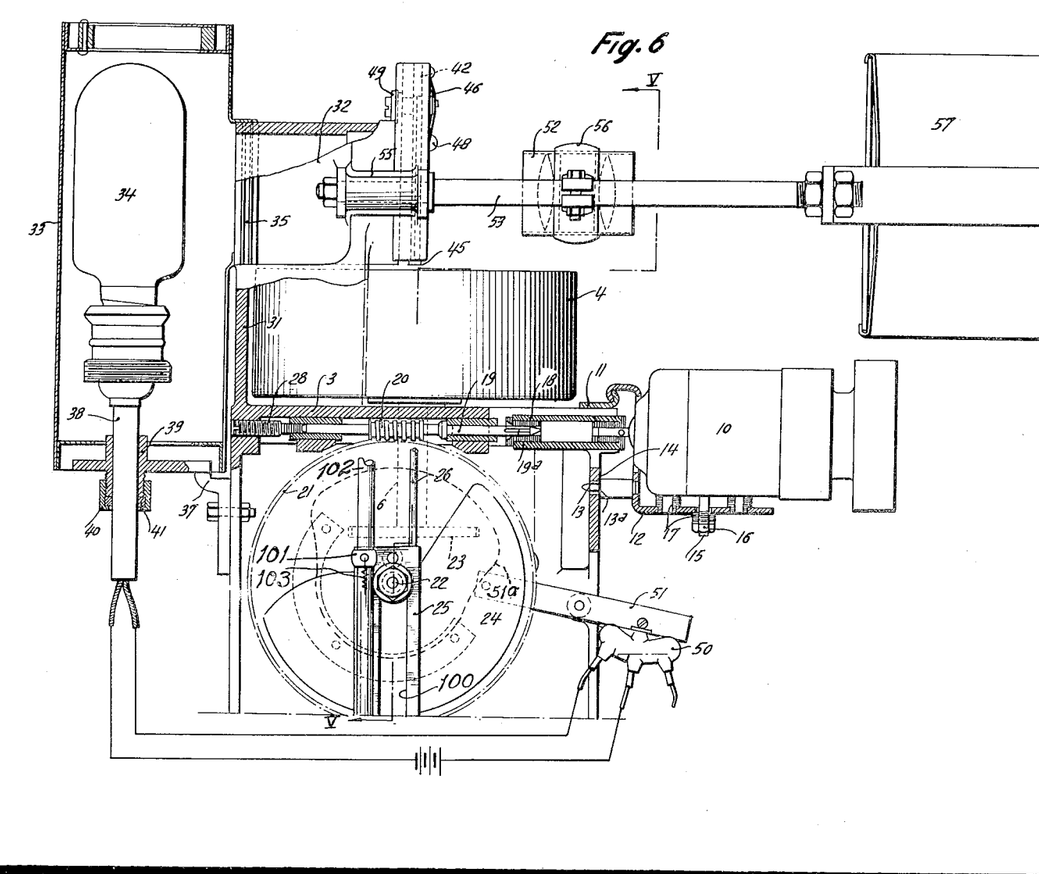
Figure 7:
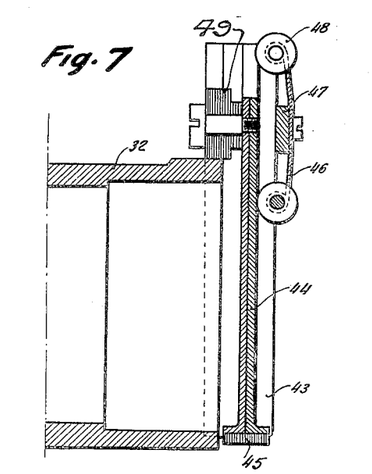
Figs. 7 and 8 are two detail sections on a larger scale of the optical device taken on the lines VII—VII and VIII—VIII respectively of Fig. 5, Figs. 9 and 10 relate to a first method of constructing the device for guiding the shutter, being respectively a front view and a plan view.
Figure 8:
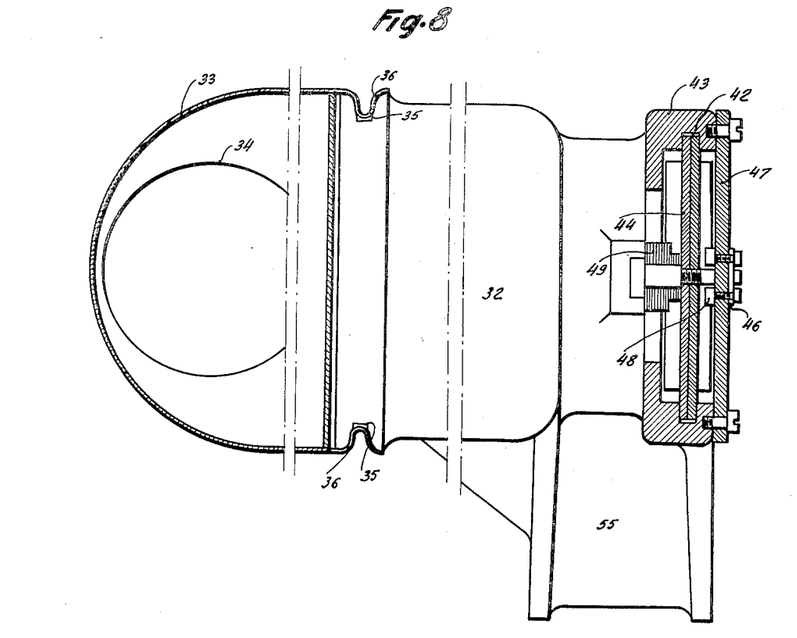

This movement is produced by a small electric motor 10 mounted on the front edge of the table 3 (Fig. 6). For this purpose, this edge carries a hook-like member 11 fixed by screws on its top face and turned upwards; the motor 10, on the other hand, is carried by an angle iron 12 the top edge of which is also turned over so as to be capable of engaging the member 11.

The angle iron 12 carries a projecting pin 13, the end of which engages in a corresponding opening 14 in the frame for the purpose of centering the motor, this pin embodies a shoulder 13a abutting against the edges of the opening 14.

The engagement of the two members 11 and 12 and the abutment of the pin 13 on the frame are sufficient to keep the motor in position. It can thus be easily mounted and dismounted, for example in order to exchange it if it should sustain any damage.

The fixing of the motor 10 on the angle iron 12 is effected by a screwed pin 15 integral with the motor and passing through this angle iron, and by a nut 16 screwing on pin 15.

Rings 17 of rubber or any other suitable material are inserted between the motor and the angle member 12 and between the latter and the nut 16.

These rings prevent the transmission of the vibrations or tremors of the motor to the other members and, notably, to the optical device or the plate undergoing projection.

On the end of the shaft of the motor 10 is pinned a rubber sleeve 18 which serves as an elastic coupling with a shaft 19 the grooved end 19a of which is adapted to engage in this sleeve.

This system of coupling enables the motor to be displaced in relation to the shaft 19 when mounting and dismounting take place.

The shaft 19 drives, through the intermediary of an endless screw gear 20—21, an axle 22 which, in turn, actuates the drum 4 step by step by means of a finger 23ª engageable with a ratchet wheel 23 keyed on the axle 6. The axle 22 also operates through the intermediary of a cam 24 and a follower mounted as a slidable plate 25, a lifting rod 26 which passes through the table 3 and the bottom of the drum 4 through suitably arranged orifices for the purpose of lifting the plate to be projected into alignment with the optical system. The plate 25 has a central elongated slot 100 and is provided with apertured lugs 101, 101ª engaging a fixed slide bar 102.

A spring 103 connected between the lug 101 and the foot 1 serves to draw the plate 25 down.

It is necessary, in order to effect certain operations, particularly to mount and dismount the drum 4 carrying the plates, to stop its drive at the moment when the lifting rod 26 is in its bottom position, in order to be able to do this without difficulty and without risk of straining any part.

Fig. 16 represents a device which enables this result to be produced automatically.

This device comprises a rod 75 which slides in a socket 76 located in the wall of the frame which supports the bearing of the axis 22 of the transmission gearing; the end of this rod is located to the right of the rim of the wheel 21 and it is urged towards this wheel by a spring 77 compressed between the socket 76 and a shoulder 75a of the rod 75.

In normal use, this rod is kept away from the wheel 21 by a pin 78 which passes through it and which abuts against the bottom of a shallow groove 79 made on the edge of the socket 76.

Another deeper slot 80 is made in this socket, in the diametral plane perpendicular to that of the groove 79, so that when a quarter of a turn is given to the rod 75, from the position shown, by means of a milled-edged button 81 fixed to its end, the rod 75 is released and pushes this rod on to the wheel 21.

The latter has a recess 82 cut at a place which comes to the left of the rod 75 and such that when the latter is engaged therein, the wheel is stopped in such a position that the plate lifter is in its bottom position.

During this movement, the shoulder 75a, moreover, comes into abutment against a flexible blade 83 and causes, by bending this blade, the opening of a switch 84 which controls the circuit of the motor 10. The latter is thus automatically stopped and the apparatus is locked in the desired position.

In order to start it up again, it is sufficient to pull the milled edged button 81 thus compressing the spring 77 and then to turn the button 81 through a quarter of a revolution.

In order to enable a precise regulation of the gear 20—21 to be effected, the bore of the bush in which the axle 22 rotates is itself rotatable and the bore is cut slightly eccentric. The axle 19 is rendered immovable longitudinally by an abutment consisting of a regulatable screw 28.

Figures 12, 13, 15:
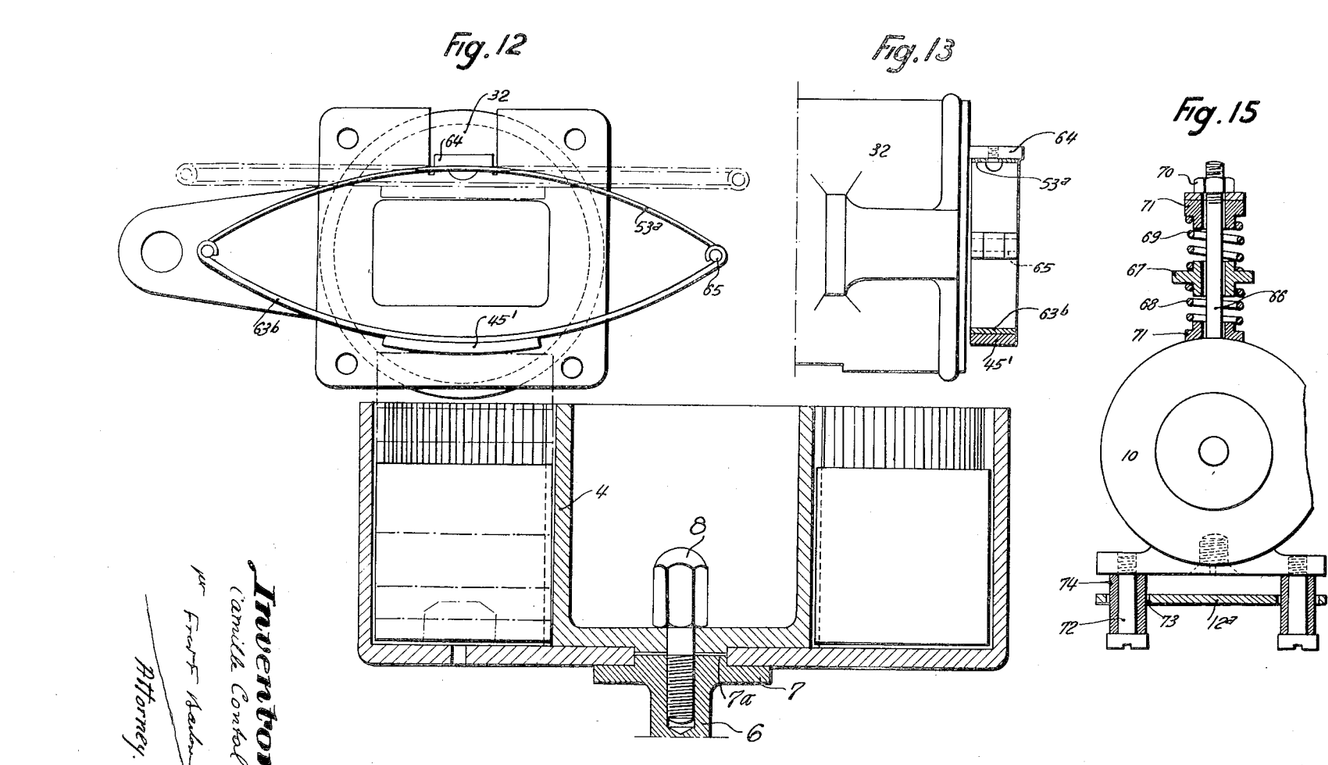
Figs. 12 and 13 represent another device for guiding the shutter and are respectively a front view and a side elevation partly in section.
Figs. 14 and 15 represent a device for fixing the motor to the frame and are respectively a longitudinal section and a transverse section of this device.
Figure 14:
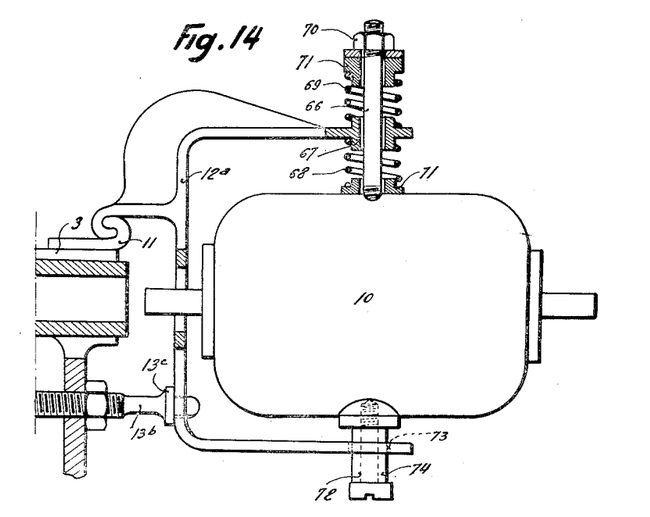

Figs. 14 and 15 represent another method of fixing the motor to the stand which comprises a support 12a fixed to the table 3 by a hook member 11 engaging another hook member on the table, just as in the device described above for fixing the angle iron 12.

The centering of this support is also obtained in a similar manner, by means of a pin 13b which is integral with the frame and engaging in a hole in the support 12a and which pin embodies a shoulder 13c against which the latter abuts.

The motor 10 is suspended on this support through the intermediary of a rod 66 which is fixed on its casing, and which passes freely through a socket 67 in the top part of the support. The suspension is ensured by two springs 68 and 69 threaded on this rod, one on each side of the support, and compressed between the latter and, respectively, the motor and a nut 70 screwed on the end of the rod, with the interposition of rubber abutments 71 in each case.

The height of the motor in relation to the support can be regulated by suitably screwing or unscrewing the screw nut 70, thus tightening the lower spring 68 more or less.

The damping of the motor is effected by two other rods 72 which are fixed beneath its casing and pass through two openings 73 made in the bottom part of the support 12a. Rubber sleeves 74 are threaded on these rods and deaden the shocks against the support.

The whole ensures the suspension of the motor under very satisfactory conditions and prevents its vibrations from being transmitted to the frame.

The lubrication of the various members hereinbefore mentioned is ensured by a series of channels 29 bored in the frame and leading to the points to be lubricated.

Figure 1:
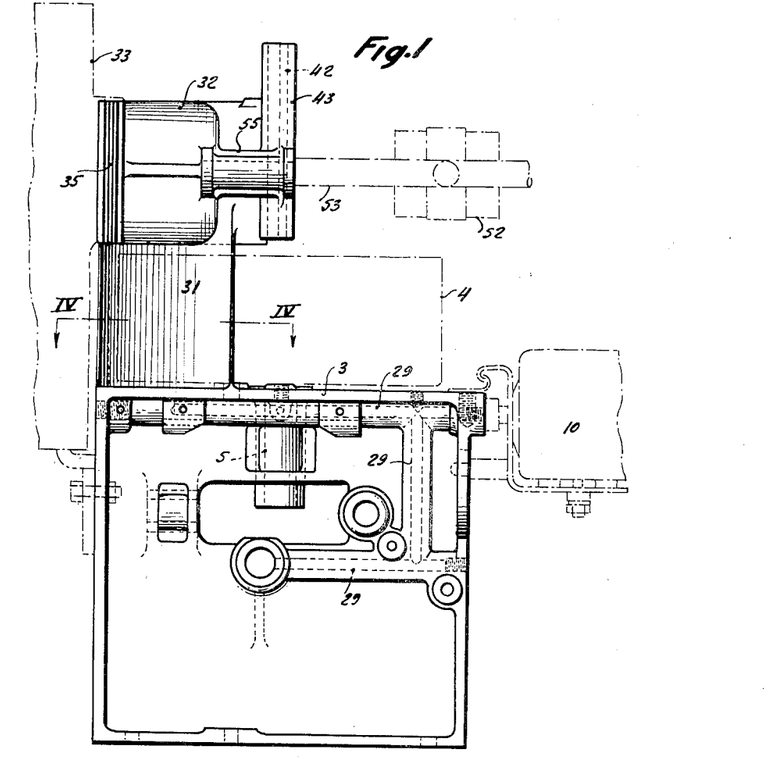
Fig. 1 is a side elevation of the frame.
Figure 2:
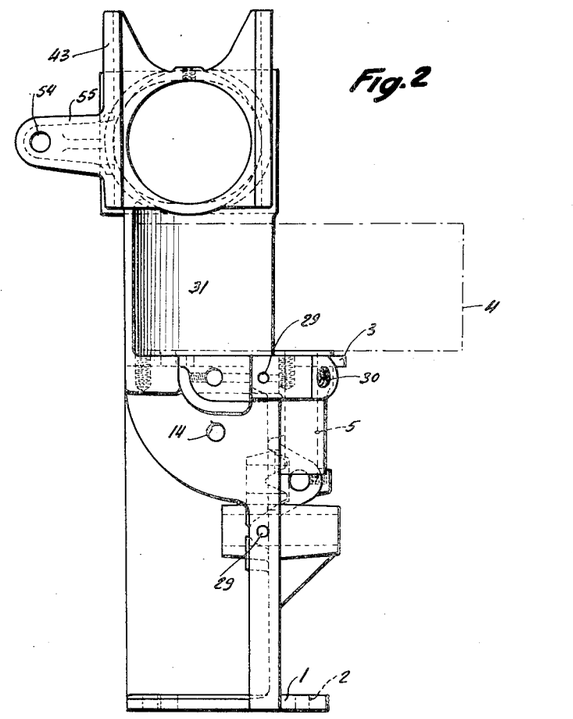
Fig. 2 is a front view.
Figure 3:
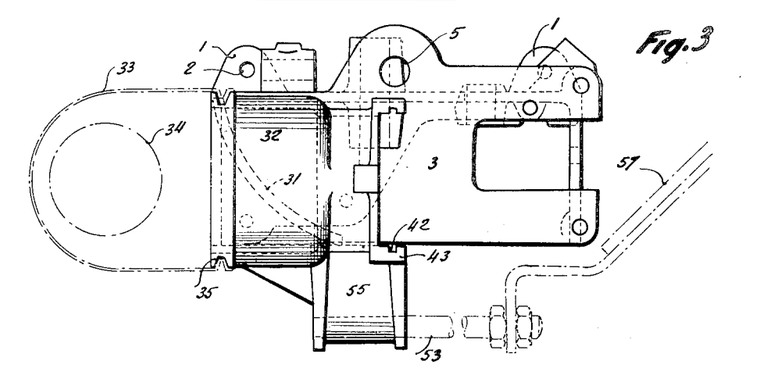
Fig. 3 is a plan view.
Figure 4:
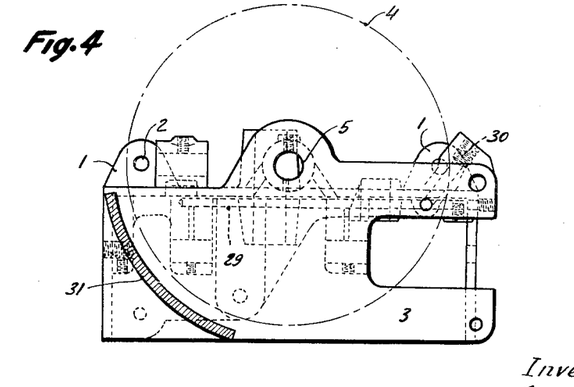
Fig. 4 is a section on the line IV—IV of Fig. 1.

These channels open outwards through a screw-threaded orifice 30 (Figs. 2 and 4) adapted to receive a screw-threaded lubricator (not shown) which feeds them.

It is thus sufficient, in order to ensure a suitable lubrication of the apparatus, to give the lubricator a few turns from time to time.

The optical device of the apparatus is carried above the drum 4 by a curved vertical wall 31 and by a cylindrical body 32 cast on the top of this wall.

The back of this cylindrical body supports a sheet iron casing 33 containing the source of light consisting of an electric lamp 34 and to this end the body is provided at each side with a vertical groove 35 in which engages a ridge 36 of corresponding shape integral with the casing 33. The latter rests on a fixed flange 37.

To put the casing 33 into position, it is therefore sufficient to slip the ridges 36 into the grooves 35, and to push the casing home to the bottom and it is just as easily withdrawn by the reverse movement.

The lamp 34 is fixed inside the casing 33 by frictional engagement of a cylindrical supporting rod 38, in a socket 39 at the bottom of the casing, the rod being locked in place in the socket by means of a screw-threaded ring 40 screwed on the socket 39, and a rubber ring 41 or the like.

For the purpose of regulating the position of the lamp 34, it is sufficient to slide or turn the rod 38 in the socket 39; if necessary, the ring 41 may be slackened before sliding the rod and then re-tightened.

The body 32 carries a suitable light condenser (not shown) and, in front, a device for guiding the plate that has been raised by the lifting rod 26.

This guiding device comprises two grooves 42 cut in wing portions 43 placed on one side and the other of the body and a shutter 44 the edges of which slide in these grooves and beneath which is fixed a buffer 45 of felt or similar material.

The plate to be projected is located beneath this shutter so that when it is raised by the rod 26 it, in turn, raises the said shutter by means of its top edge.

The friction exerted between the plate and the buffer 45 is sufficient to prevent the vibration of the plate, and to maintain it in a constant vertical plane during the whole period of the projection.

The vibration of the shutter 44 in the grooves 42 is itself prevented by a blade spring 46 fixed to a bar 47 carried by the portions 43 outside the field of the objective lens, and provided at its ends with rollers 48 which bear on the shutter 44 and hold it against the back edges of the grooves 42.

When the lifter 26 redescends and allows the plate to fall back into the drum 4, the shutter 44 redescends with the plate until a rubber abutment 49 on the shutter comes to rest on the body 32.

At this moment, the shutter 44 closes the orifice of this body.

Owing to this device, a perfect guidance of the plate in relation to the objective lens is ensured, notwithstanding the relative independence of the latter and of the drum and the play that necessarily exists in the guiding grooves of the latter and in the transmission members producing its movement, which cause the position of the plate in relation to the objective lens when it is raised to be incapable of being strictly determined.

Figure 9:
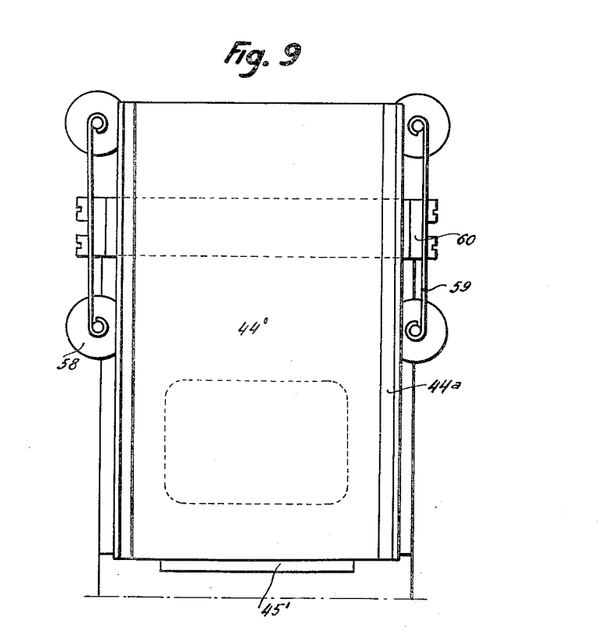
Figure 10:
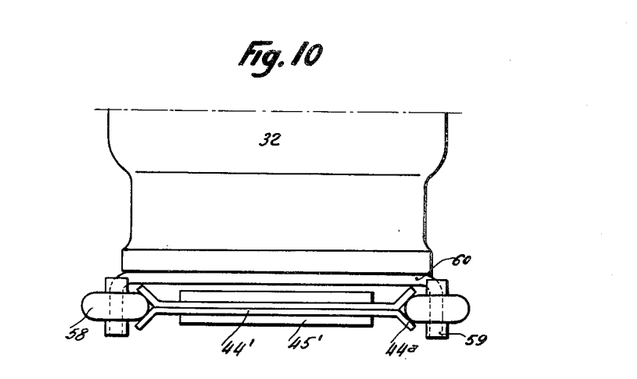

The modified shutter represented in Figs. 9 and 10 comprises a shutter 44' which slides in front of the body 32 carrying the source of light and the objective lens; this shutter is raised by the plates to be projected when they are brought in front of the objective lens, and keeps them fixed by the friction of their top edge against a pad or buffer 45' of rubber or other suitable material fixed on its bottom part.

The guiding of this shutter is effected in the following manner:—

Its two vertical edges each bear an angle iron 44a in which run two rollers 58 respectively mounted on the ends of a blade spring 59; this blade 59 is itself fixed at its middle to a carrier 60 integral with the body 32 and it is formed so as to press the castors which it carries against the angle iron 44a, so that the combined action of the two blades arranged in this manner guides the vertical sliding of the shutter without allowing it any play.

The rollers 58 have, besides, preferably rounded edges and each of them is in contact with the corresponding angle iron at two points only; the vertical movement of the shutter therefore does not produce any friction between its edges and its guiding device, and this feature in conjunction with the device for taking up play above described, avoids all wear and noise.

Figure 11:
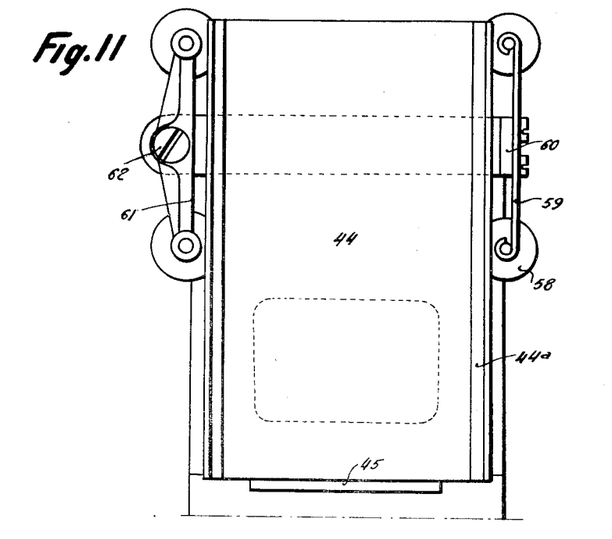
Fig. 11 is a front view of a modification of the device just mentioned.

In the device represented in Fig. 11, the rollers corresponding to one of the sides of the shutter are mounted on the ends of a rigid arm 61 which is pivotally mounted at its middle on a fixed axle 62; this arrangement affords the advantage of ensuring a perfect carriage of the four rollers and requires less precision in the construction of the spring 59 carrying the rollers.

In the modification represented in Figs. 12 and 13, the shutter 44 or 44' is omitted and replaced by a spring of the "elliptic" type, placed in front of the orifice of the body 32, and oscillating in a vertical plane.

The top blade 53a of this spring is fixed at its middle to a lug 64, located above the said orifice and cast with the body 32 or fixed to its front face in any other suitable manner; the bottom blade 63b carries at its middle the pad 45' beneath which bears the plate to be projected.

These two spring blades are assembled at each of their ends by pins 65 on which the said ends, suitable cut, are wound.

In Fig. 12, the spring is represented in its bottom position in full lines, and in its top position in dot-dash lines.

The plate of the drum 4 which is to be projected jected is located in the same vertical plane as the spring.

When this plate is raised so as to come into the position of projection, its bottom edge comes to bear beneath the pad 45' (after having described a certain course, during which period the grooves of the drum guide the plate sufficiently) then progressively compresses the spring, until it brings it into the position shown by dot-dash lines.

The guiding and fixing of the plate are therefore effected by the same mechanism as in the preceding devices, except that the weight of the shutter 44 is here replaced by the tension of the spring and also that it is unnecessary to provide any guiding system; this device is thus notably simplified and, moreover, perfectly silent.

There may also be provided a switch consisting, for example, of a bulb 50 containing mercury, fixed on a pivoting lever 51 of which the oscillations are produced by a suitable cam 51ª on the shaft 22, the whole being so arranged that the lamp 34 is extinguished during the changes of plate.

The objective lens 52 of the apparatus is carried by a rod 53, engaging in a hole 54 made in a carrier 55 integral with the body 32. It is fixed on this rod by means of a clamping collar 56, and can therefore be easily dismounted, remounted, or focussed.

The end of the rod 53 may, if required, carry an adjustable mirror 57, which can suitably be inclined on the optical axis of the objective lens in the case in which the distance available between the apparatus and the projection screen would not allow the apparatus to be placed directly in front of the screen.

It should be understood that the invention is not limited to the method of carrying it out above described merely by way of example and that the details of carrying it into effect can be varied in any suitable manner, notably with regard to the mounting of the various members on the frame, without departing from it.

Any suitable method may likewise be provided for constructing the various devices which not being indispensable to the understanding of the invention, have only been briefly described— e. g., transmission gears between the motor 10 and the members that it actuates.

The arrangements hereinbefore described can also be applied to apparatus of a quite different type, notably in which the plates to be projected are arranged in a different manner.

What I claim and desire to secure by Letters Patent of the United States of America is:—

1. In optical projection apparatus using a number of plates adapted to be brought successively to the projection position, a frame, a magazine drum for said plates, an optical system including illuminant, and condenser and objective lenses, a lifter rod to bring any one of said plates into the axis of the optical system, a driving motor for rotating said drum step by step and for actuating said lifter rod, a support for said motor, a hook-like member on said support, a co-operating hook-like member on the frame and additional positioning means on said support adapted to engage the frame.

2. In optical projection apparatus using a number of plates adapted to be brought successively to the projection position, a frame, a rotatable magazine drum for the plates journalled in said frame, an optical system including an illuminant and condenser and objective lenses, a vertically movable rod adapted to come under the magazine drum and lift one of the plates therein according to the position of the drum into the projection position, an electric motor, means driven by said motor adapted to rotate said magazine drum step by step and to lift the said rod, a support for said motor, a hook-like element on said support, a co-operating hook-like element on the frame and additional positioning means on said motor support adapted to engage the frame.

3. In optical projection apparatus using a number of plates adapted to be brought successively to the projection position, a frame, a rotatable magazine drum for the plates journalled in said frame, an optical system including an illuminant and condenser and objective lenses, a vertically movable rod adapted to come under the magazine drum and lift one of the plates therein according to the position of the drum into the projection position, means for rotating the magazine drum step by step and for raising and lowering said rod, said means including an electric motor, a support for said motor, a hook-like portion on said motor support, a co-operating hook-like portion on the frame, projecting elements below the motor fitting within apertures in the motor support, resilient buffers on said projecting elements adapted to cushion the vibrations transmissible to the support, and a projecting element on said support adapted to fit within an aperture in the frame.

4. In optical projection apparatus using a number of plates adapted to be brought successively to the projection position, a frame, a rotatable magazine drum for the plates journalled in said frame, an optical system including an illuminant and condenser and objective lenses, a vertically movable rod adapted to come under the magazine drum and lift one of the plates therein according to the position of the drum into the projection position, an electric motor for rotating the magazine drum step by step and for raising and lowering said rod, a motor support, a hook-like portion on said support, a co-operating hook-like portion on the frame, a pin projecting upwardly from said motor through an aperture in the support, a nut screwed on to the outer end of said pin, springs around said pin between the support and the motor casing and between the support and said nut, rubber washers between the motor casing and the adjacent end of the spring and between the said nut and the adjacent end of the other spring, a second pin below the motor, a rubber sleeve on said pin engaging an aperture in the support and a locating member fixed to the frame and engaging an aperture in the support.

5. In optical projection apparatus using a number of plates adapted to be brought successively to the projection position, a frame, a rotatable magazine drum for the plates journalled in said frame, an optical system including an illuminant and condenser and objective lenses, a rotary toothed wheel, a worm engaging and driving said wheel, an electric motor for driving said worm, motion transmitting means between said worm and said motor including a rubber sleeve, an adjustable screw abutting the end of the worm to limit the axial movement thereof, a support for said motor, a hook-like portion on said support, a co-operating hook-like portion on the frame, a co-operating centering pin with shoulder and an aperture, on said frame and on said support, ratchet means to rotate said drum by one step for each revolution of the wheel, corresponding to a displacement of the drum between positions for which two successive plates can be raised, a cam rotating with said wheel, a follower engaged by said cam, a vertically slidable rod actuated by and with said follower, said rod being adapted to pass through one of a plurality of apertures in the under face of the drum to raise a plate from inside the drum to the projection position, and a spring to effect the return of said rod to its inoperative position, said cam being so arranged that the rod is returned to the inoperative position during the period that the drum is being rotated.

6. In optical projection apparatus using a number of plates adapted to be brought successively to the projection position, a frame, a rotatable magazine drum for the plates journalled in said frame, an optical system including an illuminant and condenser and objective lenses, a rotary toothed wheel, a worm engaging and driving said wheel, an electric motor for driving said worm, motion transmitting means between said worm and said motor including a rubber sleeve, an adjustable screw abutting the end of the worm to limit the axial movement thereof, a support for said motor, a hook-like portion on said support, a co-operating hook-like portion on the frame, a co-operating centering pin with shoulder and an aperture, on said frame and on said support, ratchet means to rotate said drum by one step for each revolution of the wheel, corresponding to a displacement of the drum between positions for which two successive plates can be raised, a cam rotating with said wheel, a vertically movable longitudinally slotted plate, apertured lugs on said plate, a fixed slide rod engaging said apertured lugs, a follower for said cam on said plate, a vertically extending rod fixed to said plate, said rod being adapted to pass through one of a plurality of apertures in the under face of the drum to raise a plate from inside the drum to the projection position, and a spring between a fixed point and a point on said plate to draw the latter downwards, the cam being so arranged in relation to the ratchet means that the plate and the vertically extending rod fixed thereto remain in their inoperative position during the period when the ratchet is rotating the drum.

7. In optical projection apparatus using a number of plates, adapted to be brought successively to the projection position, a frame, a rotatable magazine drum for the plates journalled in said frame, an electric lamp bulb, a lamp casing, means for adjustably supporting said lamp bulb in said casing, a vertically movable rod adapted to be projected through one of a series of apertures in the magazine drum and to lift one of the plates in front of a light outlet in said lamp casing, means for rotating said drum through a small angle, corresponding to the angular distance separating two plates and for effecting the vertical motion of said rod while the magazine drum is stationary, said means including an electric motor and a cam driven thereby, a further cam driven by said motor, a switch actuated by said further cam, electrical connecting means between said switch and lamp bulb whereby the latter can be illuminated only when a plate is raised to the projection position, a support for said motor, a hook-like element on said support, a co-operating hook-like element on the frame and additional positioning means on said motor support adapted to engage the frame.

8. In optical projection apparatus using a number of plates adapted to be brought successively to the projection position, a frame, a rotatable magazine drum for the plates journalled in said frame, an electric lamp bulb, a lamp socket, a rod-like member supporting said socket, a lamp casing having an aperture engaged by said rod-like member, means to fix said member in adjusted position in said aperture, a slidable rear cover for said lamp casing with ribs fitting in recesses in said casing, a vertically movable rod adapted to be projected through one of a series of apertures in the magazine drum and to lift one of the plates in front of a light outlet in said lamp casing, means for rotating said drum through a small angle corresponding to the angular distance separating two plates and for effecting the vertical motion of said rod while the magazine drum is stationary, said means including an electric motor and a cam driven thereby, a further cam driven by said motor, a switch actuated by said cam, electrical connecting means between said switch and lamp bulb whereby the latter can be illuminated only when a plate is raised to the projection position, a support for said motor, a hook-like element on said support, a co-operating hook-like element on the frame and additional positioning means on said motor support adapted to engage the frame.

9. In optical projection apparatus using a number of plates adapted to be brought successively to the projection position, a frame, a rotatable magazine drum for the plates journalled in said frame, an optical system including an illuminant and condenser and objective lenses, a vertically movable rod adapted to come under the magazine drum and lift one of the plates therein according to the position of the drum into the projection position, a vertically movable shutter adapted to be lifted by a plate being raised to the projection position, spring pressed rollers engaging said shutter to obviate vibration, a resilient buffer to limit the downward movement of the shutter, an electric motor, means driven by said motor adapted to rotate said magazine drum step by step and to lift said rod, a support for said motor, a hook-like element on said support, a co-operating hook-like element on the frame and additional positioning means on said motor support adapted to engage the frame.

10. In optical projection apparatus using a number of plates adapted to be brought successively to the projection position, a frame, a rotatable magazine drum for the plates journalled in said frame, an optical system including an illuminant and condenser and objective lenses, a vertically movable rod adapted to come under the magazine drum and lift one of the plates therein according to the position of the drum into the projection position, a vertically movable shutter located so as to be lifted by a plate being raised to the projection position, longitudinal recesses in the edges of said shutter, rollers engaged in the said recesses at the edges of the shutter, spring pressing means for some of said rollers to obviate shake of the shutter, means to limit the downward movement of the shutter, an electric motor, means driven by said motor adapted to rotate said magazine drum step by step and to lift said rod, a support for said motor, a hook-like element on said support, a co-operating hook-like element on the frame and additional positioning means on said motor support adapted to engage the frame.

11. In optical projection apparatus using a number of plates adapted to be brought successively to the projection position, a frame, a rotatable magazine drum for the plates journalled in said frame, an optical system including an illuminant and condenser and objective lenses, an electric motor, means driven by said motor adapted to rotate said magazine drum step by step, a vertically movable rod below the magazine drum adapted to be lifted by said motor to raise one of the plates to the projection position, a gear wheel driven by said motor, a recess in said wheel, a plunger adapted to engage said recess to stop the wheel, spring means to urge said plunger towards the gear wheel, means to retain the plunger in an inoperative position, contact members actuated by said plunger and connected to the motor to break the circuit thereof when the plunger engages said recess, a support for said motor, a hook-like element on said support, a co-operating hook-like element on the frame and additional positioning means on said motor support adapted to engage the frame.

12. In optical projection apparatus using a number of plates adapted to be brought successively to the projection position, a frame, a rotatable magazine drum for the plates journalled in said frame, an optical system including an illuminant and condenser and objective lenses, a vertically movable rod adapted to come under the magazine drum and lift one of the plates therein according to the position of the drum into the projection position, an electric motor, means driven by said motor adapted to rotate said magazine drum step by step and to lift said rod, a support for said motor, a hook-like element on said support, a co-operating hook-like element on the frame, additional positioning means on said motor support adapted to engage the frame, lubricating passages leading to all the movable parts, and means for supplying lubricant thereto.

CAMILLE CONTAL.